US011034111B2

(12) United States Patent
Daidoji et al.

(10) Patent No.: US 11,034,111 B2
(45) Date of Patent: Jun. 15, 2021

(54) PIVOTED DUAL ROLLER TIRE SIDEWALL AND BODY PLY STITCHER UNIT AND METHOD FOR STITCHING THEREOF

(71) Applicant: Bridgestone Americas Tire Operations, LLC, Nashville, TN (US)

(72) Inventors: Sandro Daidoji, Antioch, TN (US); Christopher D. Ellis, Hermitage, TN (US); Phillip T. Brasher, Jr., Nashville, TN (US); Jason J. Para, Franklin, TN (US); Blair Kim, Marietta, GA (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 283 days.

(21) Appl. No.: 16/168,872

(22) Filed: Oct. 24, 2018

(65) Prior Publication Data

US 2019/0126579 A1    May 2, 2019

Related U.S. Application Data

(60) Provisional application No. 62/577,312, filed on Oct. 26, 2017.

(51) Int. Cl.
*B29D 30/24* (2006.01)
*B29D 30/28* (2006.01)
*B29D 30/72* (2006.01)
*B29D 30/32* (2006.01)

(52) U.S. Cl.
CPC ........... *B29D 30/248* (2013.01); *B29D 30/28* (2013.01); *B29D 30/72* (2013.01); *B29D 2030/3257* (2013.01)

(58) Field of Classification Search
CPC ...... B29D 30/14; B29D 30/248; B29D 30/28; B29D 30/72; B29D 2030/3257; B29C 65/62; B29C 66/83413
USPC ............................................. 156/421; 492/13
See application file for complete search history.

(56) References Cited

U.S. PATENT DOCUMENTS

| 2,500,273 | A | | 3/1950 | Breth |
| 3,954,538 | A | * | 5/1976 | Grawey ................ B29D 30/08 156/117 |
| 4,004,961 | A | | 1/1977 | Takasuga et al. |
| 4,295,916 | A | | 10/1981 | Stevens |
| 4,808,257 | A | | 2/1989 | Rex et al. |

(Continued)

FOREIGN PATENT DOCUMENTS

JP    2000289122 A    * 10/2000

OTHER PUBLICATIONS

Masanobu Takahashi, JP-2000289122-A, machine translation. (Year: 2000).*

*Primary Examiner* — Robert C Dye
*Assistant Examiner* — Sedef E Paquette

(57) ABSTRACT

Various embodiments relate to a pivoted dual roller tire sidewall and body ply stitching apparatus for stitching tire components, the apparatus including a first roller having a toroidal shape and connected to a first supporting arm, a second roller having a toroidal shape and connected to a second supporting arm and a supporting member connected to the first roller, the second roller and a third supporting arm wherein the second supporting arm is longer than the first supporting arm and the first roller and the second roller are configured to pivot on the supporting member.

9 Claims, 5 Drawing Sheets

(56) References Cited

U.S. PATENT DOCUMENTS

| | | |
|---|---|---|
| 5,312,502 A | 5/1994 | Imai et al. |
| 8,419,873 B2 | 4/2013 | Tatara et al. |
| 2006/0037712 A1* | 2/2006 | Peinelt .................. B60C 25/132 157/1.22 |
| 2010/0276068 A1* | 11/2010 | Marchini ............... B29D 30/32 156/133 |

* cited by examiner

PIVOTED DUAL ROLLER TIRE SIDEWALL AND BODY PLY STITCHER UNIT AND METHOD FOR STITCHING THEREOF

TECHNICAL FIELD

Various embodiments disclosed herein relate generally to a tire stitching apparatus and, more particularly but not exclusively, to a pivoted dual roller tire sidewall and body ply stitching apparatus.

BACKGROUND

Tire manufacturers use different types of rolling or stitching devices to stitch together sidewall which comprise a tire carcass.

The sidewall are wrapped around a building drum and stitched together by a tire stitching apparatus.

For example, in order to manufacture a tire, sidewall is wound around a carcass. In order for the sidewall to be stitched to the carcass, force must be applied against the rubber strips to bind them together, specifically by a roller which applies pressure on the tire carcass against the building drum.

The binding action is a continuous action to bond the sidewall to the carcass and ensure no air pockets remain between the sidewall and carcass.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a pivoted dual roller tire sidewall and body ply stitching apparatus for stitching tire components, the apparatus including a first roller having a toroidal shape and connected to a first supporting arm, a second roller having a toroidal shape and connected to a second supporting arm, a supporting member connected to the first roller, the second roller and a third supporting arm, wherein the second supporting arm is longer than the first supporting arm and the first roller and the second roller are configured to pivot on the supporting member.

In an embodiment of the present disclosure, the stitching apparatus further includes an offset between the first roller and the second roller based a distance between the first supporting arm and the second supporting arm.

In an embodiment of the present disclosure, the stitching apparatus further includes an overlap between the first roller and the second roller based on a length of the firsts supporting arm and the second supporting arm.

In an embodiment of the present disclosure, the third supporting arm is positioned between the first supporting arm and the second supporting arm on the supporting member.

In an embodiment of the present disclosure, the supporting members includes a first hole, a second hole and a third hole, where the first supporting member is inserted into the first hole, the second supporting member is inserted into the second hole and the third supporting members is inserted in the third hole.

In an embodiment of the present disclosure, the first hole and the second hole are semicircular.

In an embodiment of the present disclosure, the first roller is configured to rotate around the first supporting member and the second roller is configured to rotate around the second supporting member.

In an embodiment of the present disclosure, the first roller and the second roller are configured to apply pressure to a tire carcass on a building drum.

Various embodiments described herein relate to a method for stitching tire components using a dual roller tire sidewall and body ply stitching apparatus, the method including the steps of stitching, by a first roller having a toroidal shape and connected to a first supporting arm, the tire components and stitching, by a second roller having a toroidal shape and connected to a second supporting arm, wherein a supporting member is connected to the first roller, the second roller and a third supporting arm, the second supporting arm is longer than the first supporting arm and the first roller and the second roller are configured to pivot on the supporting member.

BRIEF DESCRIPTION OF THE DRAWINGS

In order to better understand various embodiments, reference is made to the accompanying drawings, wherein.

DETAILED DESCRIPTION

Figure 1:
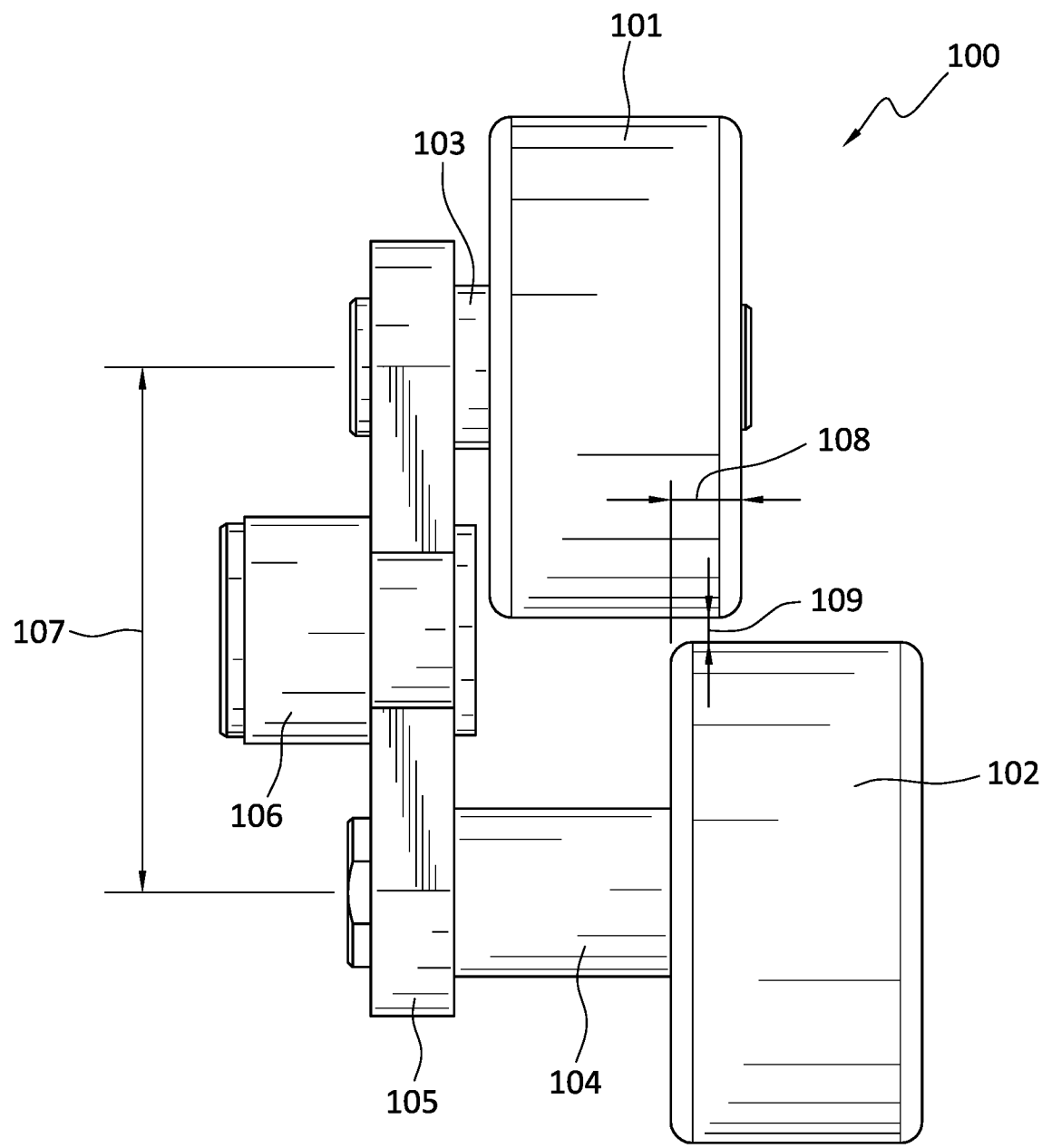
FIG. 1 illustrates a front view of an embodiment of the pivoted dual roller tire sidewall and body ply stitcher apparatus.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

The existing designs and techniques either require a single narrow stitching roller which more closely (as compared to a wide stitching roller) follows the shape of the tire carcass when rotated because it is narrower.

Alternatively, a single wider stitching roller (as compared to a narrow stitching roller) which allows for faster stitching speeds, however, does not as closely follow the shape of the tire carcass and further leaves more air pockets between sidewall that form the tire.

During tire manufacturing, there are sidewalls of varying lengths, widths and thickness that are layered on top of the carcass on a building drum.

Once the sidewall have been rolled around a building drum, the tire carcass is formed and because the sidewall are of varying lengths, widths and thicknesses, the resulting tire carcass is not level. Therefore, using either a single narrow stitching roller or a single wider stitching roller is inefficient as the resulting tire carcass is not level and equal pressure is not applied to the entire tire carcass.

Equal pressure must be applied to the entire carcass to ensure no air pockets are left between the sidewall and carcass that are laid on the building drum.

For example, with a single narrow stitching roller, the narrow stitching roller is able to meet more of the changing shape of the tire carcass. However, it is slower to complete the stitching process as the surface area is smaller for the single narrow stitching roller which increases the time to stitch the sidewall together to form the tire carcass and the tire.

For example, with a single wider stitching roller, because the stitching roller is wider it has more surface area and therefore able to stitch more of the sidewall faster than a narrower roller. However, it is not able to make contact with the entirely of the surface of the sidewall as often as a narrower roller because it is wider and therefore more air pockets result in the tire carcass.

These embodiments address the need for a tire stitching apparatus which is a dual tire stitching roller that can make consistent contact with the sidewall during the stitching process while stitching the sidewall at the same speed, or faster, than the single wide stitching roller.

To reduce the deficiencies in the current designs and techniques, it would be desirable to provide an apparatus having pivoted dual rollers. Therefore, these embodiments below describe a pivoted dual roller tire sidewall and body ply stitcher apparatus which includes a dual cylinder to allow consistent contact with the sidewall during the stitching process while stitching the sidewall together at the same speed, or faster than the single wide stitching roller.

To provide such an apparatus, various embodiments described herein utilize a stitcher apparatus with two rollers which are connected to two separate cylinders in order to reduce the size and ensure their size is compact to fit into existing tire manufacturing machines. Various alternative and additional beneficial features will be described below.

While various embodiments explained in detail herein are described with respect to tire stitching, it will be apparent that this apparatus may be adapted to other manufacturing areas. Various modifications to enable adaptation to such other areas will be apparent.

FIG. 1 illustrates a pivoted dual roller tire sidewall and body ply stitching apparatus 100 including a first roller 101 and a second roller 102, where the first roller 101 and the second roller 102 pivot on the supporting member 105 on the axle The first roller 101 and the second roller 102 are metal rollers in a cylindrical shape. The first roller 101 and the second roller 102 may also be made of urethane, alternative plastics, foam, etc.

The first roller 101 rotates around a first support arm 103 and the second roller 102 rotates around a second support arm 104, where the second support arm 104 is longer in length than the first support arm 103 which allows both the first roller 101 and the second roller 102 to overlap. The length of the first support arm 103 and the second support arm 104 vary based on the diameter of the first roller 101 and the second roller 102 or application.

The length of the first support arm 103 and the second support arm 104 may be varied to different lengths for various configurations.

The first roller 101 and the second roller 102 are offset from each other and create an offset 109 between the first roller 101 and the second roller 102 to allow for rotation around the supporting arms.

The first support arm 103 and the second support arm 104 are connected to each other by a supporting member 105.

The first support arm 103 extends from the support member 105 to the end of the first roller 101.

The second support arm 104 extends from the support member 105 to the end of the second roller 102.

The support member 105 includes three holes to fit the support arms. The length 107 from the center of the hole in the support member 105 for the first support arm 103 to the center of the hole in the support member 105 for the second support arm 104 allows the first roller 101 and the second roller 102 to rotate without interfering with the other roller.

The varying lengths of the first support arm 103 and the second support arm 104 creates the overlap 108 between the first roller 101 and the second roller 102.

The varying distance between the first roller 101 and the second roller 102 creates the offset 109. The offset value may vary from a value of zero up to a value of up to one half of the width of the first roller 101 or the second roller 102.

By varying the lengths of the support arms, the overlap 108 can be increased or decreased to change the surface area covered during a single cycle (i.e., rotation) of the building drum.

By varying the distance between the rollers, the offset 109 can be increased or decreased to change the surface area covered during a single cycle (i.e., rotation) of the building drum.

The supporting member 105 is connected to the tire manufacturing device (not illustrated) using a third support arm 106.

The hole for the third support arm 106 is positioned between the hole for the first support arm 103 on the supporting member 105 and the hole for the second support arm 104 on the supporting member 105.

In this embodiment, by creating the overlap 108, the contact area is increased, as two rollers are being used and the rollers are still able to conform to different tire carcass shapes. Depending on the durometer of the roller material, the roller may be flexible to confirm to changes to shape of the tire carcass.

As the pivoted dual roller tire sidewall and body ply stitching apparatus 200 traverses across the tire carcass surface, the first roller 101 and the second roller 102 may pivot on the supporting member 105 which allows the pivoted dual roller tire sidewall and body ply stitching apparatus 200 to conform to the surface shape of the tire carcass to be stitched.

By using a first roller 101 and a second roller 102, the pivoting effect allows for the rollers to follow the shape of the tire carcass.

Figure 2:
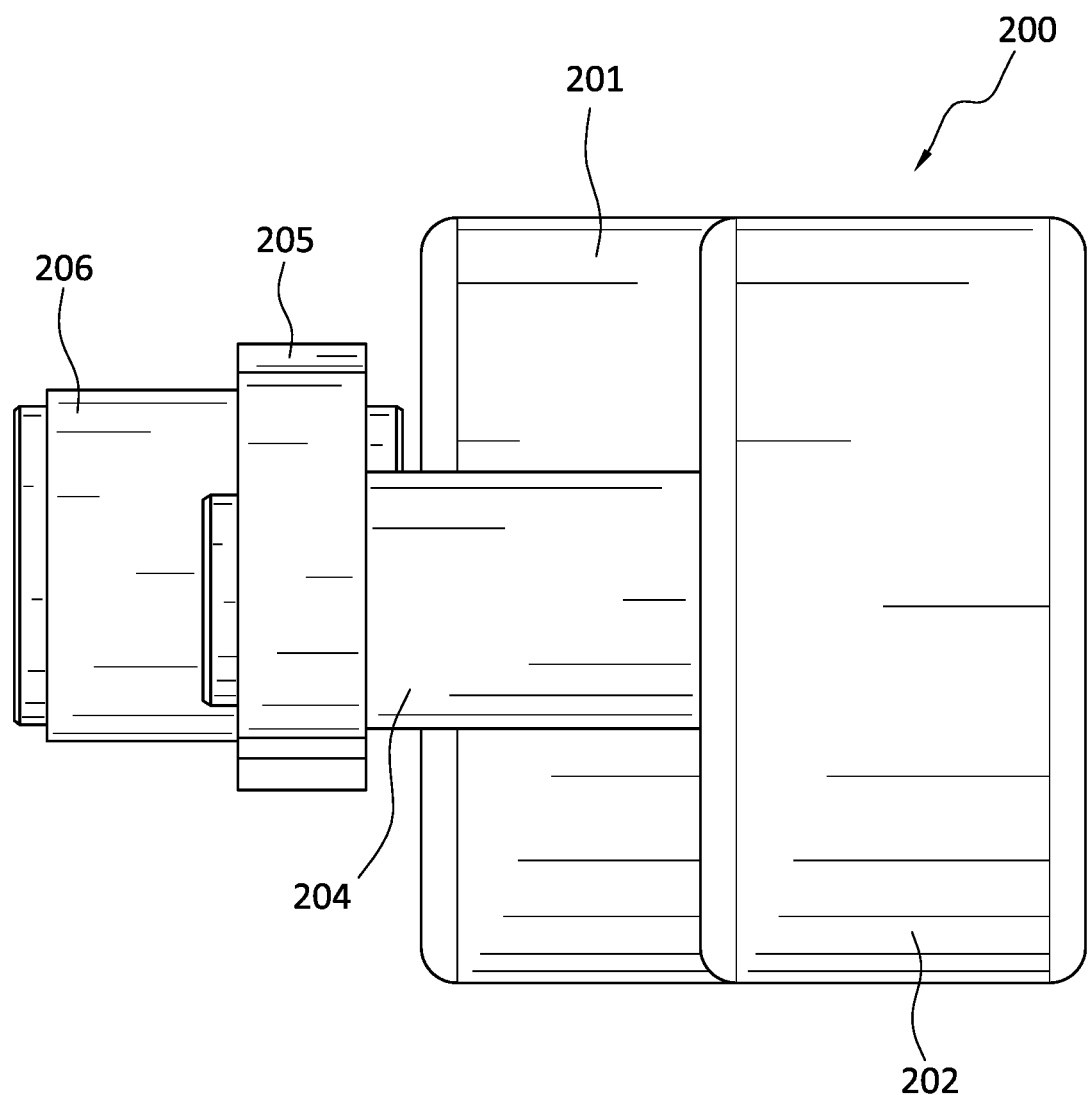
FIG. 2 illustrates a top view of an embodiment of the pivoted dual roller tire sidewall and body ply stitcher apparatus.

FIG. 2 illustrates a top view of an embodiment of the pivoted dual roller tire sidewall and body ply stitching apparatus 200.

The pivoted dual roller tire sidewall and body ply stitching apparatus 200 includes a first roller 201, a second roller 202, a supporting member 205, a second support arm 204 and a third support arm 206.

In this embodiment, by varying the lengths of the first support arm 203 and the second support arm 204, the distance between the first roller 201 and the second roller 202 can be zero (i.e., the first roller 201 and the second roller 202 overlap to ensure the contact area is increased while covering the tire without a gap).

Figure 3:
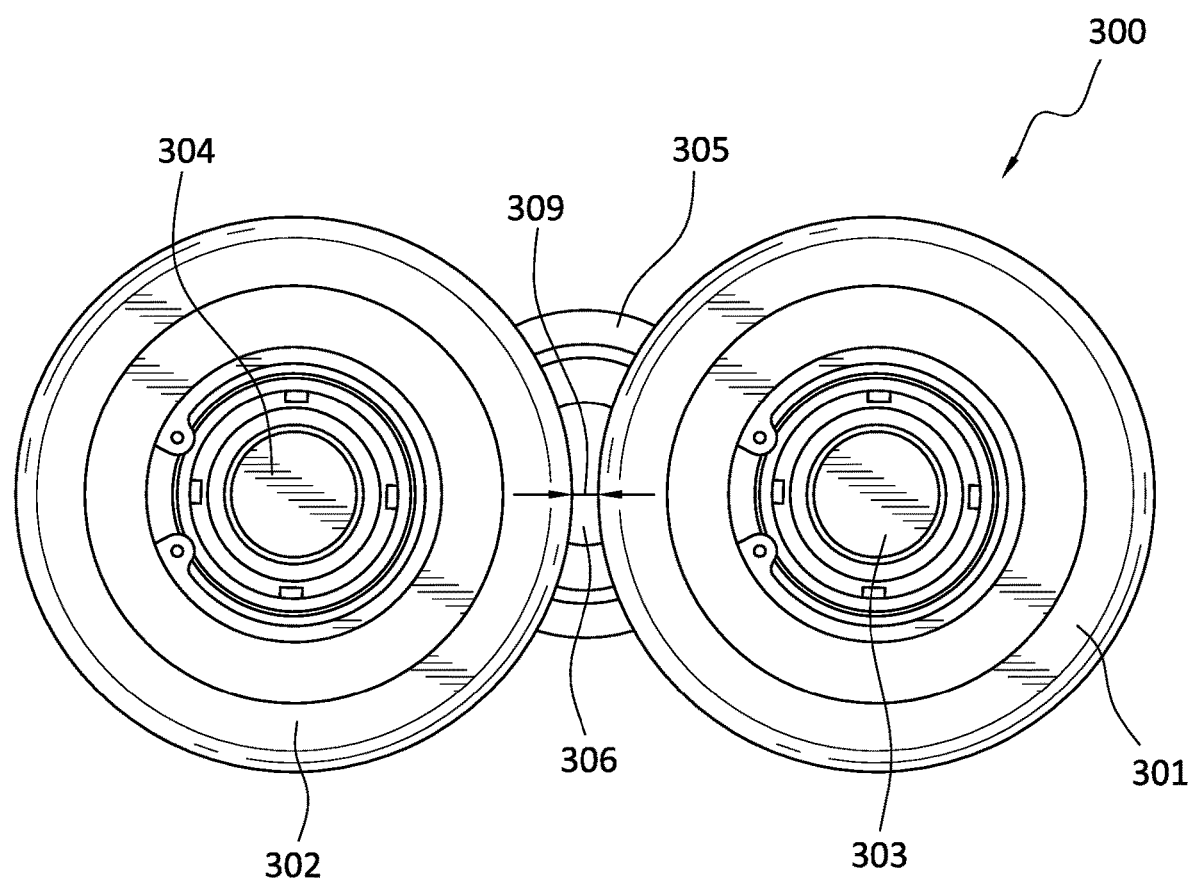
FIG. 3 illustrates a side view of an embodiment of the pivoted dual roller tire sidewall and body ply stitcher apparatus.

FIG. 3 illustrates a side view of an embodiment of the pivoted dual roller tire sidewall and body ply stitching apparatus 300.

The pivoted dual roller tire sidewall and body ply stitching apparatus 300 includes a first roller 301 connected by a first support arm 303, a second roller 302 connected by a second support arm 304. The first support arm 303 and the second support arm 304 being connected to the supporting member 305 and the third support arm 306.

In this embodiment, by varying the offset 309, the distance between the first roller 301 and the second roller 302 ensures the rollers can rotate around their respective support members without interference.

Figure 4:
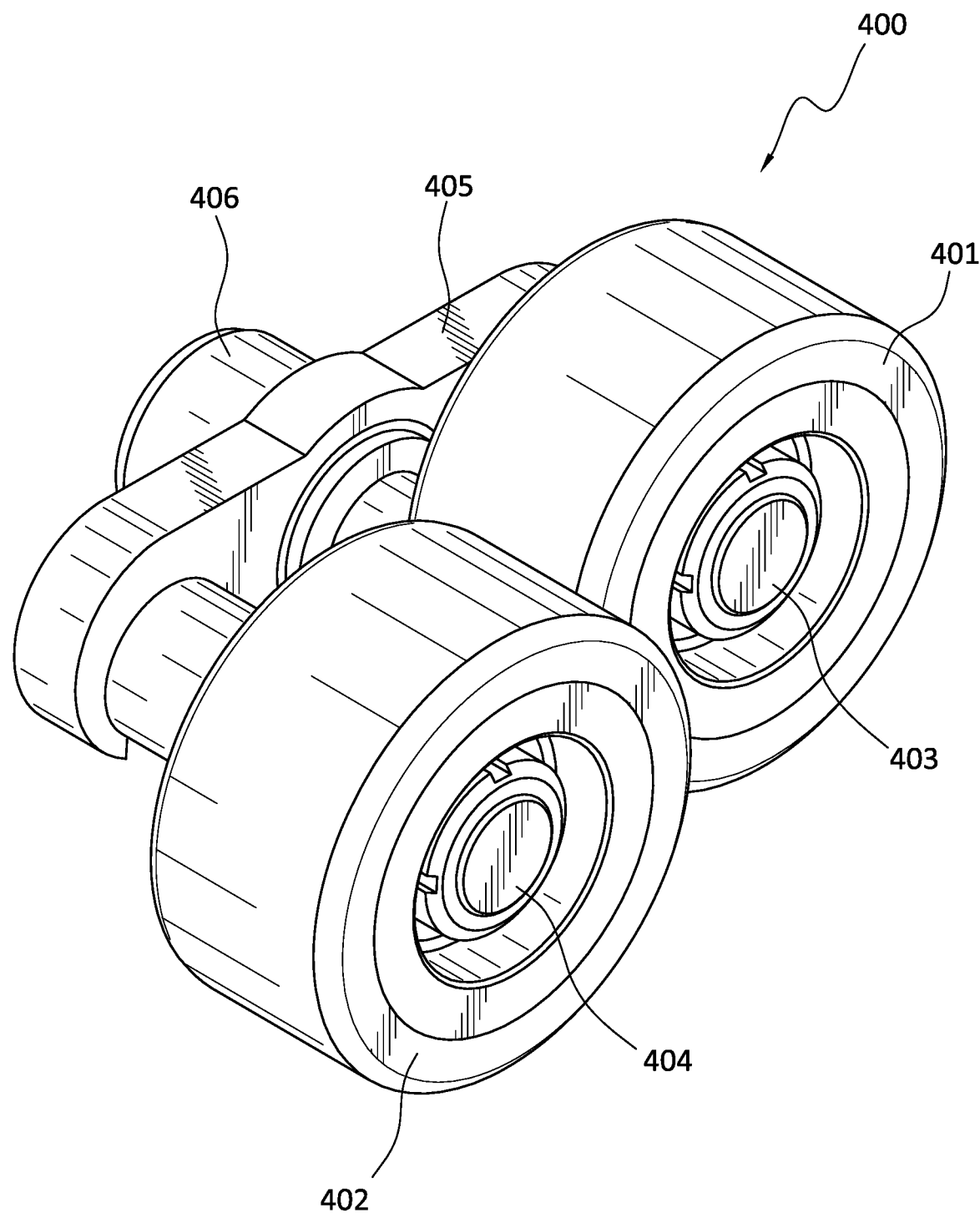
FIG. 4 illustrates a top perspective view of an embodiment of the pivoted dual roller tire sidewall and body ply stitcher apparatus.

FIG. 4 illustrates a top perspective view of an embodiment of the pivoted dual roller tire sidewall and body ply stitcher apparatus 400.

The pivoted dual roller tire sidewall and body ply stitcher apparatus 400 includes a first roller 401 a second roller 402, a first support arm 403, a second support arm 404, a supporting member 405 and a third support arm 406.

The hole for the first support arm 403 for the first roller 401 on the supporting member 405 is semicircular allowing the first support arm 403 to be removed from the supporting member 405.

In this embodiment, the hole for the second support arm 404 for the second roller 402 on the supporting member 405 is semicircular allowing the second support arm 404 to be removed from the supporting member 405.

Figure 5:
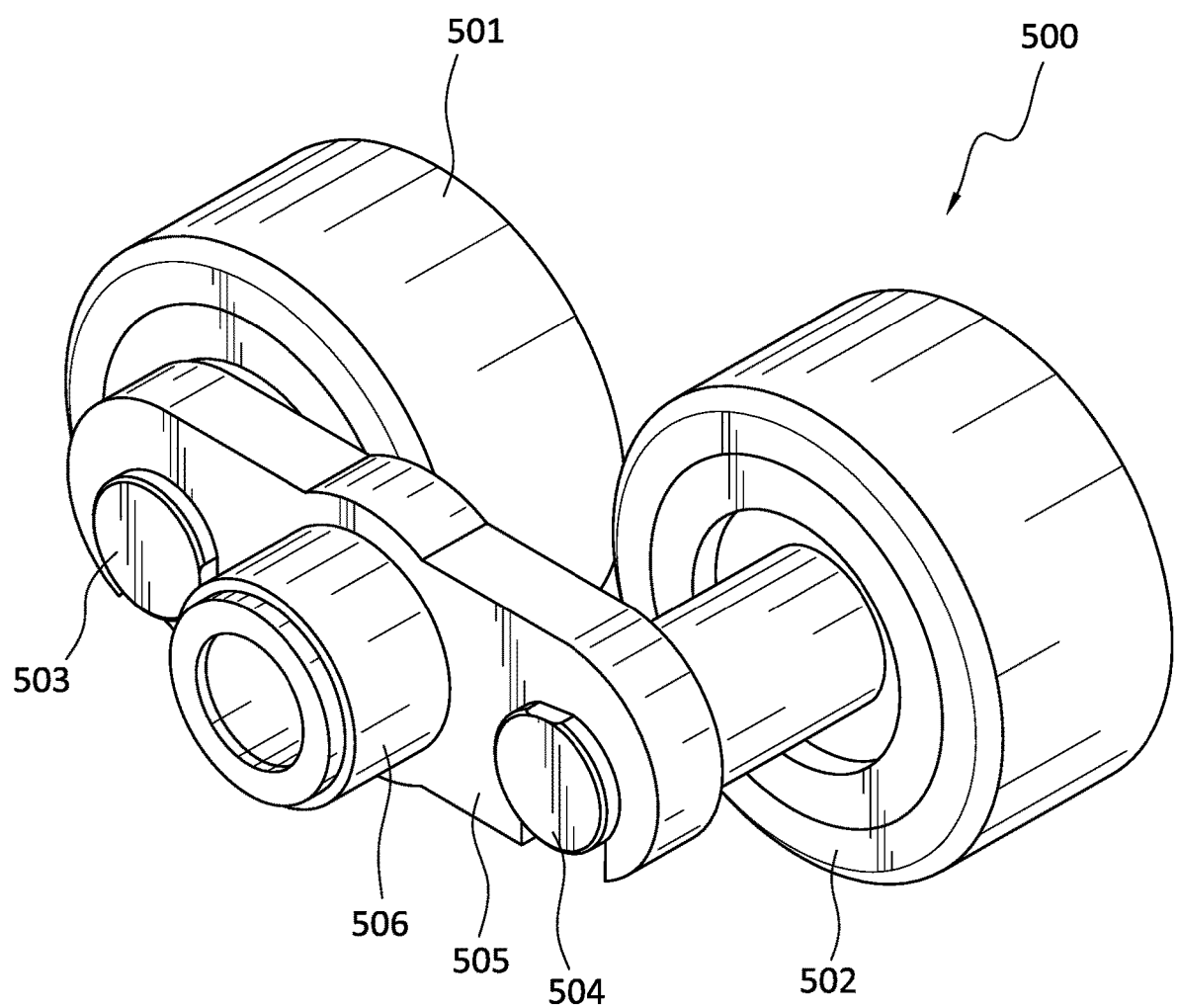
FIG. 5 illustrates a top perspective view of an embodiment of the pivoted dual roller tire sidewall and body ply stitcher apparatus, and To facilitate understanding, identical reference numerals have been used to designate elements having substantially the same or similar structure or substantially the same or similar function.

FIG. 5 illustrates a top perspective view of an embodiment of the pivoted dual roller tire sidewall and body ply stitching apparatus 500.

The pivoted dual roller tire sidewall and body ply stitching apparatus 500 includes a first roller 501, a second roller 502, a first support arm 503, a second support arm 504, a supporting member 505 and a third support arm 506.

As discussed above, the first roller 501 has a hole which the first support arm 503 is inserted into to hold the first roller 501 and allow the first roller 501 to rotate.

The second roller 502 has a hole which the second support arm 504 is inserted into to hold the second roller 502 and allow the second roller 502 to rotate.

The first support arm 503 and the second support arm 504 are inserted into two holes on the supporting member 505. The supporting member 505 also may include a third support arm 506 positioned between the first support arm 503 and the second support arm 504.

The pivoted dual roller tire sidewall and body ply stitching apparatus may be used in a method for stitching a tire carcass together, by positioning the first roller and the second roller along the tire carcass which applying pressure which allows each roller to conform to the tire carcass and stitch the tire carcass together. While the pressure is being applied by the apparatus, the tire carcass may be rotating.

The first roller and the second roller may pivot along the supporting member to conform to the tire carcass. The pivoted dual roller tire sidewall and body ply stitching apparatus may continue along the tire carcass until it reaches the end of the tire carcass and may repeat this step until the tire carcass is stitched together.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A dual roller tire sidewall and body ply stitching apparatus for stitching tire components, the apparatus comprising:
   a first roller having a toroidal shape and connected to a first supporting arm;
   a second roller having a toroidal shape and connected to a second supporting arm;
   a third supporting arm between the first supporting arm and the second supporting arm; and
   a supporting member connected to the first supporting arm, the second supporting arm, and the third supporting arm, wherein
   the second supporting arm is longer than the first supporting arm,
   the supporting member connected to the first supporting arm and the second supporting arm is configured to pivot about the third supporting arm,
   the supporting member includes a first semicircular hole and a second semicircular hole,
   the first supporting arm is removably inserted into the first semicircular hole and the second supporting arm is removably inserted into the second semicircular hole; and
   an overlap between the first roller and the second roller is based on respective lengths of the first supporting arm and the second supporting arm, wherein a size of the overlap is adjustable by varying the lengths of the first and second supporting arms.

2. The stitching apparatus of claim 1, further comprising:
   an offset between the first roller and the second roller based on a distance between the first supporting arm and the second supporting arm.

3. The stitching apparatus of claim 1, wherein:
   the supporting member further includes a third hole, where
   the third supporting arm is inserted in the third hole.

4. A method for stitching tire components using a dual roller tire sidewall and body ply stitching apparatus, the method comprising the steps of:
   stitching, by a first roller having a toroidal shape and connected to a first supporting arm, the tire components, and
   stitching, by a second roller having a toroidal shape and connected to a second supporting arm, the tire components, wherein
   a supporting member is connected to the first supporting arm, the second supporting arm, and a third supporting arm between the first supporting arm and the second supporting arm;
   the second supporting arm is longer than the first supporting arm, the supporting member connected to the first roller and the second roller is configured to pivot about the third supporting arm the supporting member includes a first semicircular hole and a second semicircular hole, the first supporting arm is removably inserted into the first semicircular hole and the second supporting arm is removably inserted into the second semicircular hole, and an overlap between the first roller and the second roller is based on respective lengths of the first supporting arm and the second supporting arm, wherein a size of the overlap is adjustable by varying the lengths of the first and second supporting arms is removably inserted into the second semicircular hole.

5. A dual roller tire sidewall and body ply stitching apparatus for stitching tire components, the apparatus comprising:

a first roller connected to a first supporting arm, the first roller having a toroidal shape and a first peripheral edge;

a second roller connected to a second supporting arm, the second roller having a toroidal shape and a second peripheral edge, wherein the second peripheral edge overlaps the first peripheral edge by an overlap distance of zero to one half of a width of the first roller, and a supporting member which is:
  removably connected to the first supporting arm,
  removably connected to the second supporting arm, and
  connected to a third supporting arm,
  wherein the supporting member is configured to pivot about the third supporting arm,
wherein the overlap distance is adjustable by varying the lengths of the first and second supporting arms.

6. The stitching apparatus of claim 5, wherein the first roller is configured to rotate around the first supporting member and the second roller is configured to rotate around the second supporting member.

7. The stitching apparatus of claim 5, wherein the first roller and the second roller are configured to apply pressure to a tire carcass on a building drum.

8. The stitching apparatus of claim 5, further comprising an offset between the first roller and the second roller, wherein the offset is based on a distance between the first supporting arm and the second supporting arm.

9. The stitching apparatus of claim 5, wherein the third supporting arm is positioned between the first supporting arm and the second supporting arm on the supporting member.

* * * * *